United States Patent [19]

Yasuda et al.

[11] Patent Number: 4,957,374
[45] Date of Patent: Sep. 18, 1990

[54] TUNNEL FURNACE HEIGHT DETECTOR

[75] Inventors: Keiji Yasuda, Niwa; Tetsuo Kamijyo; Kazuhiro Miyahara, all of Nagoya, Japan

[73] Assignee: NGK Insulators, Ltd., Japan

[21] Appl. No.: 328,516

[22] Filed: Mar. 24, 1989

[30] Foreign Application Priority Data

Mar. 25, 1988 [JP] Japan ................................. 63-38482

[51] Int. Cl.⁵ .......................... G01B 5/00; G01K 1/14
[52] U.S. Cl. .................................. 374/142; 33/544; 33/832; 266/99
[58] Field of Search ................. 33/544, 541, 14, 832, 33/833, 559; 374/139, 142

[56] References Cited

U.S. PATENT DOCUMENTS

| | | | |
|---|---|---|---|
| 449,920 | 4/1891 | Thom | 33/544 |
| 3,158,364 | 11/1964 | Cremer et al. | 432/241 X |
| 3,573,444 | 4/1971 | Kawabata et al. | |
| 4,483,631 | 11/1984 | Kydd | 374/179 X |
| 4,761,892 | 8/1988 | Jankkila | 33/833 X |

FOREIGN PATENT DOCUMENTS 0082772  6/1983  European Pat. Off. .
2375574  7/1978  France .

Primary Examiner—Daniel M. Yasich
Attorney, Agent, or Firm—Arnold, White & Durkee

[57]  ABSTRACT

A tunnel furnace height detector used for detecting ceiling heights of a tunnel furnace. The detector includes a plurality of detecting units arranged on a trolley traveling in the tunnel furnace in a manner such that their heights are progressively lowered by predetermined distances. Each of the detecting units includes a support base, and a solid piece pivotally connected to the support base automatically returnable from a pivotally moved position forced by an external force to an original position. The solid piece has one end in contact with a lowered ceiling and the other end closing and opening a measuring circuit system forming a closed circuit.

7 Claims, 4 Drawing Sheets

FIG_1
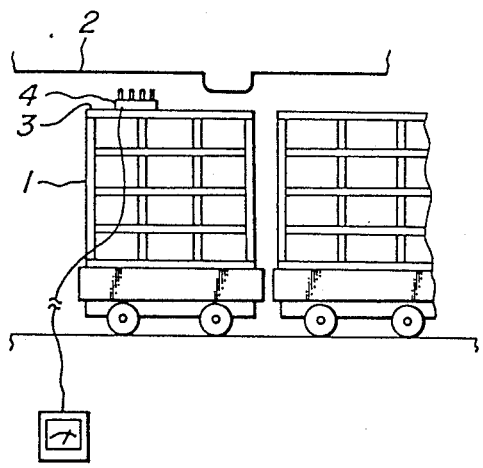
FIG_2a
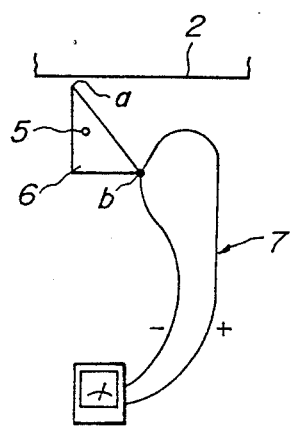
FIG_2b
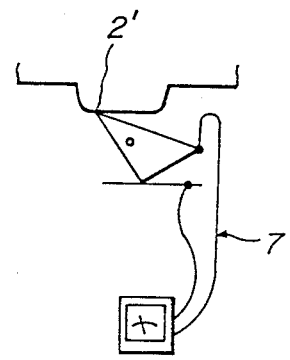

FIG. 3
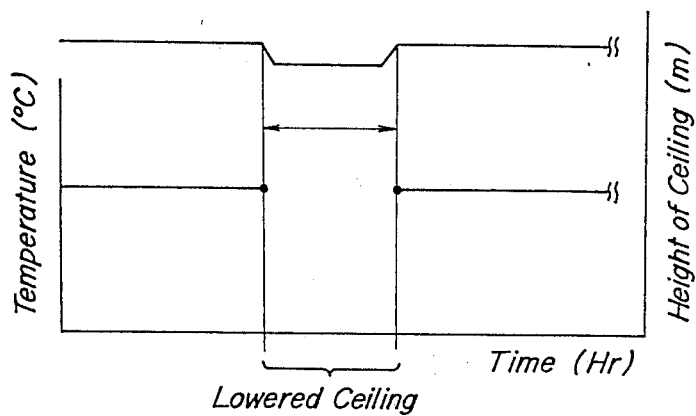
FIG. 4a
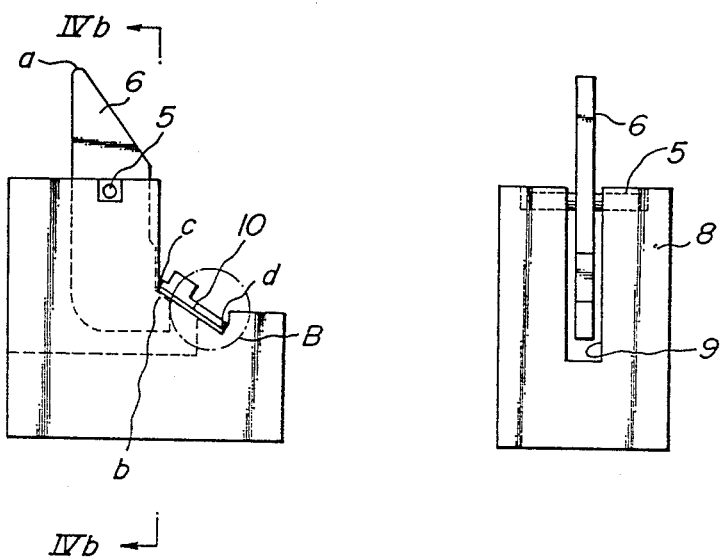
FIG. 4b

FIG_7
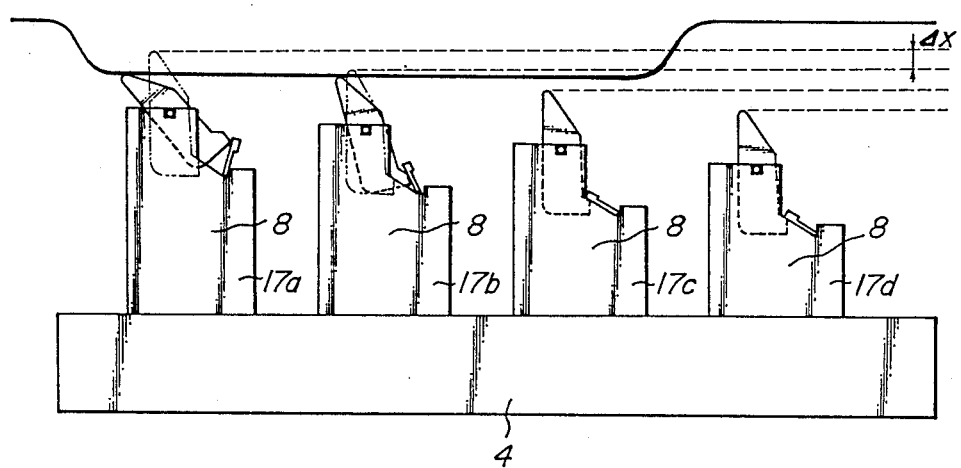

TUNNEL FURNACE HEIGHT DETECTOR

BACKGROUND OF THE INVENTION

This invention relates to a tunnel furnace height detector for detecting whether a height of a ceiling of a tunnel furnace lies in a predetermined allowable range.

When a tunnel furnace has been operated for a long period of time, a ceiling of the furnace is likely to lower due to deterioration of the furnace body. Therefore, the height of the tunnel furnace has to be inspected periodically. Such an inspection of the ceiling has been effected after operation of the furnace was shut down and the furnace temperature has been allowed to cool completely. In another case, a fiber scope is inserted through a furnace wall into the furnace to observe the lowering of the ceiling of the furnace. For example, there have been cameras utilizing optical fibers as fiber scopes, which are able to observe objects in high temperature atmospheres by cooling the cameras from an outside of the furnace by cooling water.

However, the shut down of the operation of the tunnel furnace for periodic inspection of ceiling height unavoidably lowers its production efficiency in continuous operation. On the other hand, the observation of the ceiling height by the use of fiber scopes can not numerically detect the lowering of the ceiling. Moreover, rapid lowering of the ceiling can not be detected by such conventional means, and in extreme cases therefore, there was a risk of the ceiling being falling, resulting in a terrible accident.

SUMMARY OF THE INVENTION

It is an object of the invention to provide an improved tunnel furnace height detector which eliminates the disadvantages of the prior art and which is able to detect heights of a ceiling of a tunnel furnace without shutting down operation of the tunnel furnace.

In order to achieve the object, a tunnel furnace height detector for detecting ceiling heights of a tunnel furnace according to the invention, comprises a plurality of detecting units arranged on a trolley traveling in the tunnel furnace with their heights progressively lowering by predetermined distances, each of said detecting units comprising a support base, a solid piece pivotally connected to the support base automatically returnable from a pivotally moved position forced by an external force to an original position and having one end to be in contact with a lowered ceiling and the other end closing and opening a measuring circuit system forming a closed circuit.

According to the invention, when the one end of the solid piece rotatably supported by the support base comes in contact with a lowered ceiling, the solid piece is rotated to open a measuring circuit system to detect the lowering of the ceiling. Detecting units comprising such solid pieces and support bases are arranged with the upper ends of the solid pieces progressively lowering by predetermined small distances from a height where a solid piece of one detecting unit is slightly out of contact with the ceiling, whereby a lowered ceiling can be detected by the openings of measuring circuit systems with the small distances.

Moreover, a length of the lowered ceiling can be measured by a time duration of the opening of the circuit systems and a position of the lowered ceiling can be detected by a moving schedule of a trolley supporting the detecting units. Furthermore, change in ceiling height of the tunnel furnace by aging can be observed by periodically moving the detecting units in the furnace so that suitable repair can be taken before rapid change of the ceiling height. Therefore, there is no risk of a terrible accident of falling of the furnace ceiling.

In order that the invention may be more clearly understood, preferred embodiments will be described, by way of example, with reference to the accompanying drawings.

BRIEF DESCRIPTION OF THE DRAWINGS

FIG. 1 is a schematic view of a trolley supporting a tunnel furnace height detector and moving in a tunnel furnace;

FIGS. 2a and 2b are schematic views illustrating a detecting unit of the detector according to the invention;

FIG. 3 is a graph illustrating relationships between height of ceiling, temperature and time in detecting operation;

FIG. 4a is a side view of one embodiment of a detecting unit of the detector according to the invention;

FIG. 4b is a sectional view taken along the line IVb-IVb in FIG. 4a;

FIGS. 5a, 5b and 5c are enlarged explanatory views of portion B encircled in FIG. 4a;

FIG. 7 is a schematic view illustrating the detection of a lowered ceiling by means of the detector including four detecting units according to the invention.

DETAILED EXPLANATION OF PREFERRED EMBODIMENTS

Figures 5A, 5B, 5C:
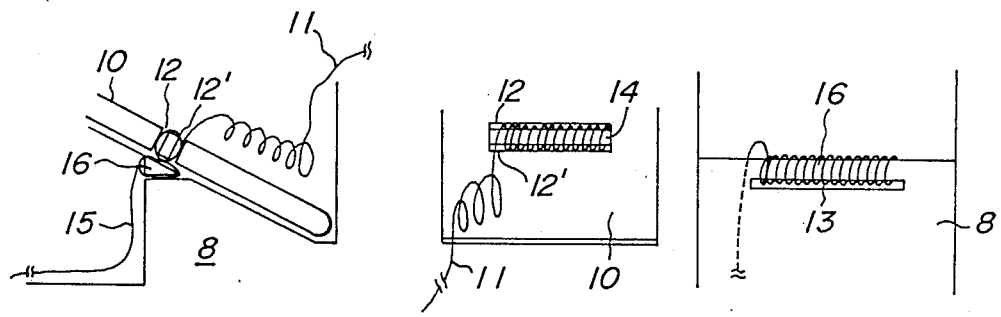

FIG. 1 illustrates a jig 4 located on a shelf plate 3 of a trolley 1 moving in a tunnel furnace for detecting heights of a ceiling 2 of the furnace.

The tunnel furnace height detector comprises detecting units which differ in height. A principle of the detector is clear from schematic views of FIGS. 2a and 2b. The detecting unit comprises a solid piece 6 which is substantially triangular in side view and rotatable about a pivotal shaft 5. One end a of the solid piece 6 does not contact a ceiling 2 having an allowable height, but contacts a ceiling 2' which has somewhat lowered due to deterioration of the furnace. On the other hand, the other end b of the solid piece 6 serves as a contact for connecting and disconnecting a measuring circuit system 7 forming a closed circuit.

With the measuring circuit system 7, when the end a of the solid piece 6 contacts the lowered ceiling 2', the other end b of the solid piece 6 opens the closed circuit to obstruct flow of electric current in the circuit. In contrast herewith, when the end a of the solid piece 6 does not contact the ceiling, the other end b closes the measuring circuit system 7.

In general, however, a tunnel furnace has ceilings different in height dependent upon heating temperature zones. Therefore, it is necessary to have detecting units with different heights. In an embodiment shown in FIGS. 2a and 2b, the measuring circuit system 7 comprises a thermocouple made of two different metals. These metals are brought into contact with each other in the proximity of the other end b of the solid piece 6, so that temperatures in the furnace can be measured when the metals contact each other. This condition is shown in FIG. 3. As can be seen from FIG. 3, a length of the lowered ceiling 2' can be detected by the time during disconnection of the circuit and moving speed of the trolley.

A concrete construction of the detecting unit by way of example will be explained by referring to FIGS. 4a and 4b.

As shown in FIG. 4a, the solid piece 6 is integrally fixed to the pivotal shaft 5 which is rotatably supported by a support base 8. The support base 8 is formed with a deep slit 9 which enables the solid piece 6 to be rotated therein (FIG. 4b). In this case, a center of gravity of the solid piece 6 is positioned below the pivotal shaft 5 so that when the solid piece 6 is out of contact with the lowered ceiling 2', the solid piece 6 can pivotally return from its inclined position to its original position.

A contacting plate 10 is provided at the other end b of the solid piece 6 and is adapted to be in contact with the other end b. The contacting plate 10 has a center of gravity on a side of a contacting end c with the other end b of the solid piece 6. Therefore, when the contacting plate 10 is rotated about the other end d of the contacting plate 10 opposite to the end c, a biasing force always acts upon the contacting end c of the contacting plate 10 so as to maintain the contact between the contacting end c and the end b of the solid piece 6.

Materials for the pivotal shaft 5, the solid piece 6 and the contacting plate 10 are preferably those mixed with a mullite, alumina or zirconia type material which is superior in heat- and wear-resistance.

A material for the support base 8 may be a material mixed with a mullite, alumina or zirconia type material or may be cordierite type material because the support base 8 is not required to be wear-resistant. Moreover, the support base 8 may be a hollow or honeycomb-shaped member.

Mounting of the measuring circuit system 7 will be explained by referring to partially enlarged drawings of FIGS. 5a-5c. A tantalum elementary wire 11 of, for example, tantalum-chromel thermocouple is wound about a part 14 formed in the contacting plate 10 by forming two slits 12 and 12' of a predetermined distance with a predetermined spaced distance in directions of short sides of the contacting plate 10 at a location where the plate 10 contacts the support base 8. On the other hand, a chromel elementary wire 15 is wound about a part 16 of the support base 8 in contact with the part 14 through slits 13 provided about the part 16.

These wires 11 and 15 are in contact with each other to form the closed circuit of the measuring circuit system 7. In order to permit the rotating operation of the contacting plate 15, these wires 11 and 15 are wound about the parts 14 and 16. The chromel wire 15 may be wound about the part 14, while the tantalum wire may be wound about the part 16.

Figure 6:
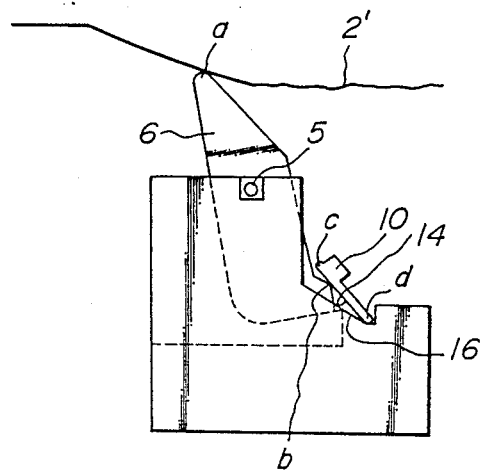
FIG. 6 is a schematic view illustrating the operation of the detecting unit according to the invention.

The operation of the solid piece 6 and the contacting plate 10 will be explained by referring to FIG. 6. When the one end a of the solid piece 6 contacts the lowered ceiling 2', the solid piece 6 is rotated about the pivotal shaft 5 in a counterclockwise direction viewed in FIG. 6 and the contacting plate 10 in contact with the other end b of the solid piece 6 is rotated about the other end d thereof. Therefore, the tantalum and chromel wires 11 and 15 come out of contact with each other owing to the rotation of the contacting plate 10 so that the measuring circuit system 7 is opened to stop the temperature measurement.

When the solid piece 6 is released from the contact with the lowered ceiling 2', the solid piece 6 is rotated in the clockwise direction to its original position, while the contacting plate 10 in contact with the other end b of the solid piece 6 is rotated about its end d in the counterclockwise direction. As a result, the tantalum and chromel wires 11 and 15 are again brought into contact with each other to close the measuring circuit system 7 so that the temperature measurement is again started.

In actual detecting operation, for example, four detecting units as above described are arranged on a jig 4 as shown in FIG. 7. The detecting units 17a-17d are different in height from bottoms of the support bases to upper ends of the solid pieces 6 in normal positions. Therefore, the respective detecting units open their measuring circuit systems dependent upon lowered condition of ceilings immediately above the units.

In FIG. 7, the detecting units 17a and 17b open their circuits, while the units 17c and 17d close their circuits. In the event that the detecting units 17a-17d are different in height by a distance $\Delta x$, respectively, it can be detected in FIG. 7 that the lowered distance h of the ceiling is between $\Delta x$ and $2 \cdot \Delta x$ or $\Delta x < h < 2 \cdot x$.

In this embodiment, the four detecting units are used. However, it is preferable that the difference in height $\Delta x$ is smaller and the number of the units is increased, in order to measure lowered distances of a ceiling more exactly.

It will of course be understood that various changes and modifications may be made in the invention without being limited to the above embodiment. For example, instead of that the measuring circuit system is opened by the contact of the solid piece of the unit with a ceiling, the circuit system may be closed when the contact between the solid piece and the ceiling takes place. In this case, a heat-resistant elastic metal piece arranged on the jig 4 is brought into contact with a continuous conductive wire arranged on a ceiling to close a measuring circuit system of each of detecting units.

As can be seen from the above explanation, according to the invention, when one end of a solid piece rotatably supported by a support base comes into contact with a lowered ceiling, the solid piece is rotated to open the measuring circuit system to detect the lowering of the ceiling. Detecting units for detecting the lowering of the ceiling in such a manner are so arranged that they are different in height and progressively lowered by a predetermined distance. According to the invention, a lowered state of a ceiling or inspection of ceiling height of the a tunnel furnace can be performed without shutting down operation of the furnace. Moreover, positions and lengths of lowered ceilings can be detected with the aid of a moving schedule of a trolley supporting the detecting units and positions and time of opened measuring circuit systems. Furthermore, by periodically moving in a furnace a trolley supporting the detecting units, a change in ceiling height by aging can be detected. Therefore, the tunnel furnace can be operated safely with high efficiency.

What is claimed is:

1. A tunnel furnace height detector for detecting a variable ceiling height of a tunnel furnace, comprising a plurality of detecting units arranged on a trolley traveling in said tunnel furnace, said plurality of detecting units each having a height which is progressively increases by a predetermined distance, each of said detecting units comprising:

a support base; and a solid piece pivotally connected to said support base, said solid piece having one end to contact said ceiling and another end to open or close an electrical measuring circuit;

wherein said solid piece is pivoted when said one end contacts said ceiling such that said another end opens said electrical measuring circuit, and said solid piece automatically returns to a position where said another end closes said electrical measuring circuit when said one end is spaced from said ceiling.

2. The tunnel furnace height detector of claim 1, wherein said solid piece is pivotally connected to said support base at a position of said solid piece which is above a center of gravity of said solid piece.

3. The tunnel furnace height detector of claim 1, further comprising a contacting plate having a first end to contact said another end of said solid piece, said contacting plate having a center of gravity located on a side of said first end thereof.

4. The tunnel furnace height detector of claim 3, wherein said solid piece, said contacting plate and/or a pivotal shaft of said solid piece which connects said solid piece to said support base comprises a material mixed with at least one material selected from the group consisting of mullite, alumina and zirconia.

5. The tunnel furnace height detector of claim 1, wherein said support bases comprises a material mixed with at least one material selected from the group consisting of mullite, alumina, zirconia and cordierite.

6. The tunnel furnace height detector of claim 1, wherein said electrical measuring circuit comprises a thermocouple which measures temperatures in the tunnel furnace when said another end of said solid piece closes said electrical measuring circuit.

7. The tunnel furnace height detector of claim 6, further comprising a contacting plate having a first end to contact said another end of said solid piece, wherein one wire of said thermocouple is wound around a portion of said contacting plate and another wire of said thermocouple is wound around a portion of said support base.

* * * * *